Figure 1:
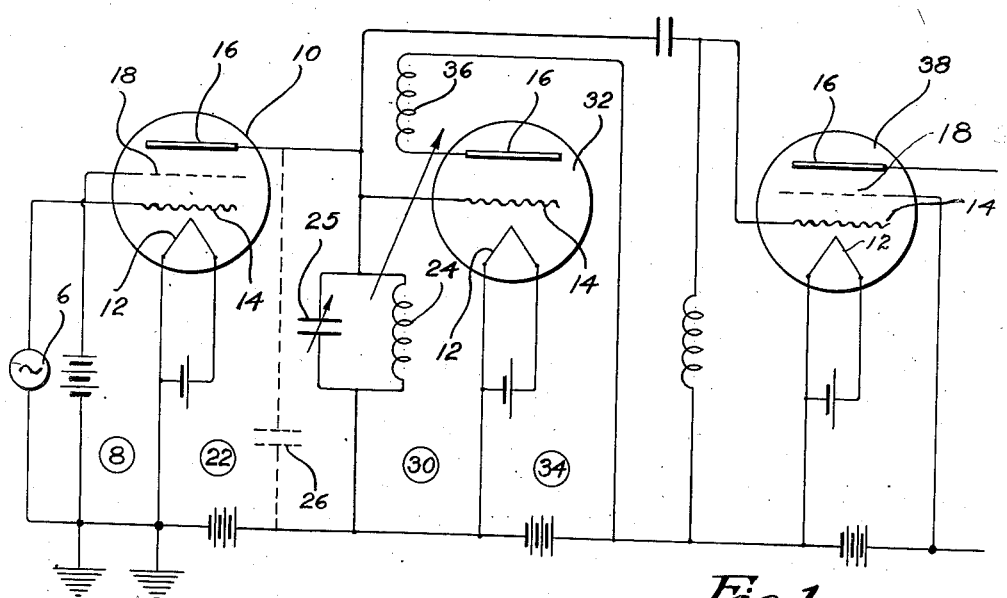

June 11, 1935.　　　　E. L. BOWLES　　　　2,004,155
ELECTRICAL SYSTEM
Filed Oct. 12, 1927

Inventor
Edward L. Bowles
By David Rines
Attorney

Patented June 11, 1935

2,004,155

UNITED STATES PATENT OFFICE 2,004,155

ELECTRICAL SYSTEM

Edward L. Bowles, Wellesley Farms, Mass.

Application October 12, 1927, Serial No. 225,678

14 Claims. (Cl. 179—171)

The present invention relates to electrical systems, and more particularly to amplifiers. From a more limited aspect, the invention relates to amplifiers of the vacuum-tube type, with more particular reference to tubes having screened or shielded grids.

In screened-grid tubes, that is tubes having an extra grid between the control grid and the plate for example, the dynamic internal plate resistance, under certain conditions of filament-plate, screen-grid and control-grid voltages is very high,—or, speaking mathematically, may be substantially infinite. If, therefore, an impedance be introduced in the external plate or output circuit small compared with this internal plate resistance, the alternating voltage drop thereacross,—assuming no other impedance in the plate circuit,—is proportional to the impedance, assuming a constant impressed alternating control-grid voltage. This result may also be verified by an inspection of the characteristic curves of such a tube, where the plate voltage is plotted, as the abscissa, against the plate current as the ordinate; for these curves, after a small sharp rise from approximately zero at zero voltage, in some cases may become substantially horizontal, the height of the horizontal portion of the curve being very approximately proportional to the impressed voltage in the control-grid circuit. Since the dynamic internal plate resistance is inversely proportional to the slope of this curve, the resistance at a given operating point approaches an infinite value as the slope of the curve approaches zero. When operating the screen-grid tube in this comparatively high or substantially infinite internal plate resistance region a very large numerical value for external plate coupling impedances may be utilized and yet fulfill the condition that its value is negligible compared with the dynamic internal resistance of the tube.

Furthermore, as already stated, when operating the screened-grid tube in this manner, the signal voltage across the external load is then directly proportional to the value of the load impedance so that in order to realize a large voltage across the impedance in the external plate circuit of the tube, this impedance must be relatively high in value. That is, assuming the dynamic internal plate resistance of the tube infinite, then any finite external plate circuit or load impedance will be negligible compared with this high internal impedance. Then the alternating plate current will be proportional to the alternating grid voltage regardless of the value of the external plate impedance. But the alternating voltage across the external plate impedance is equal to the product of the alternating current through it, in amperes, and its impedance value, in ohms. Since the current is independent of this external impedance value, the alternating voltage across it, assuming a constant impressed grid voltage, is proportional to the external impedance. Then to obtain a large voltage across this external coupling impedance to actuate any succeeding element in the amplifier, it is advantageous to have this external plate impedance as large as possible. This may be partially accomplished by using a tuned impedance, consisting, for example, of a condenser and an inductor. However the inherent resistance in the condenser and the inductor limit the value of the maximum impedance obtainable by tuning.

According to a feature of the present invention, the effective positive resistance of the plate-circuit impedance is reduced by the introduction of negative resistance in any desired manner, as by regeneration. The effects of the inherent plate-circuit capacity are neutralized in any preferred manner, as by providing a tuning condenser in parallel with the impedance.

The above discussion has proceeded upon the hypothesis that the frequency is high. For low frequencies, a further expedient is resorted to, all as will be explained in connection with the accompanying drawing, in which Fig. 1 is a diagrammatic view of circuits and apparatus constructed and arranged according to a preferred embodiment of the present invention, particularly designed for high frequencies; and Fig. 2 is a similar view, more particularly adapted for low frequencies.

A source 6 of alternating voltage to be amplified is inserted in the external input or grid circuit 8 of a four-electrode vacuum tube 10. The tube 10 comprises an evacuated vessel within which are contained an emitter of electrons, such as a hot filament 12, a control grid 14 and an anode or plate 16. A screen or screen grid 18 partially shields the control grid circuit from the plate circuit electrostatically, both at high and at low frequencies, to minimize internal feed back from the plate 16 to the control grid 14 through the tube. External feed back is prevented in any desired way, not illustrated because well known. The screen grid 18 is grounded to the filament or is maintained at a constant desirable potential in any other desired manner. The construction need not be further illustrated or described herein, being well known to persons skilled in the art.

Figure 2:
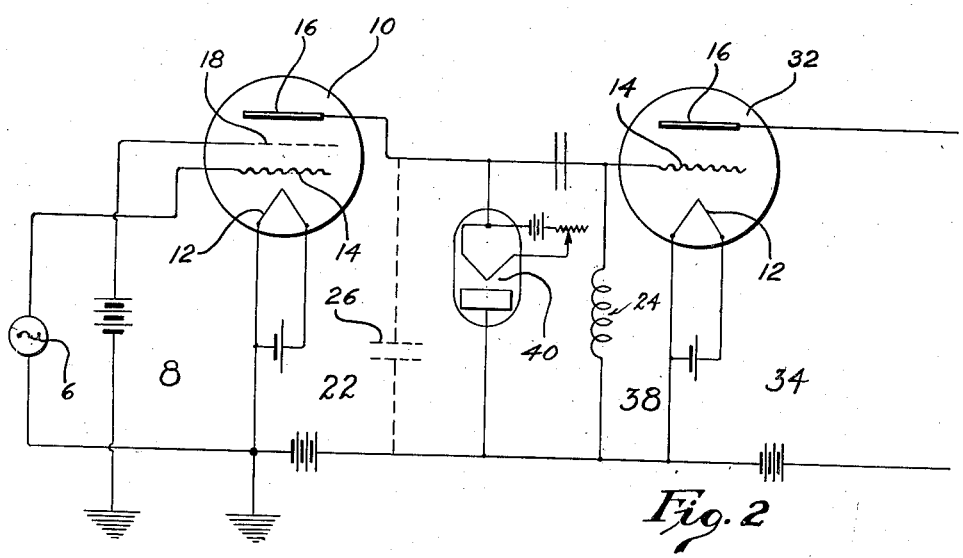

In Fig. 1, the output circuit 22, connecting the plate and the filament, has an inductive impedance 24, and naturally has also an inherent capacity 26 between the filament and the plate. This inherent capacity may be merged with a tuning condenser 25 in parallel with the inductive impedance 24.

The output circuit 22 is coupled to the input circuit 30 of a second vacuum tube 32 by the impedance 24 and the condenser 25. The output circuit 34 of the tube 32 is provided with feedback impedance 36 that is regeneratively coupled adjustably to the impedance 24. The effective impedance of the external plate impedance between the plate and the filament as a whole to the impressed voltage may thus be greatly increased by the regeneration.

Any number of additional tubes 38 may, of course, be connected in cascade further to amplify the impressed voltage. The coupling circuit means may of course be the same as that shown in Fig. 1.

The system of Fig. 1 is especially adapted for high frequencies. For low frequencies, the impedance 24 may take the form of a constant-current rectifying tube 40, as shown in Fig. 2, the connections being otherwise as before described. If the constant-current device 40 is operated under such conditions that the space current through it is independent of the voltage across it over the working range, then, within this range, it behaves toward an alternating current, as if it had an infinite resistance. Such a circuit element or its equivalent is thus of great use in conjunction with the four-electrode tube, which requires a high external plate impedance for effectiveness as an amplifier. The device 40, therefore, operates to couple screened-grid tubes at low frequencies very much as the space-current device 32 of Fig. 1 for high frequencies.

Modifications will readily occur to persons skilled in the art, and are considered to fall within the spirit and scope of the invention, as defined in the appended claims.

What is claimed is:

1. An electric system having, in combination, an input circuit, leads to the input circuit, an output circuit, leads to the output circuit, means for coupling the input circuit with the output circuit to create a tendency for the feed-back of energy from the output circuit to the input circuit, an electrode, means cooperating with the electrode for preventing the feed-back of energy from the output circuit to the input circuit, an impedance for producing a voltage drop, means connecting the impedance in the output circuit, a second input circuit, leads to the second input circuit, a second output circuit, leads to the second output circuit, means connecting the impedance in the second input circuit, and means for regeneratively coupling the second output circuit with the second input circuit to increase the effective impedance.

2. An electric system having, in combination, an amplifying tube having an input circuit and an output circuit, leads from the tube to the input circuit and the output circuit, means for coupling the input circuit with the output circuit to create a tendency for the feed-back of energy from the output circuit to the input circuit, means for preventing the feed-back of energy from the output circuit to the input circuit, an impedance for producing a voltage drop, means connecting the impedance in the output circuit, a second amplifying tube having an input circuit and an output circuit, leads from the second tube to the second input circuit and the second output circuit, means connecting the impedance in the second input circuit, and means for regeneratively coupling the second output circuit with the second input circuit to increase the effective impedance.

3. An electric system having, in combination, an amplifying tube having an input circuit, an output circuit and an electrode, leads from the tube to the input circuit and the output circuit, means for coupling the input circuit with the output circuit to create a tendency for the feed-back of energy from the output circuit to the input circuit, means cooperating with the electrode for preventing the feed-back of energy from the output circuit to the input circuit, an impedance for producing a voltage drop, means connecting the impedance in the output circuit, a second amplifying tube having an input circuit and an output circuit, leads from the second input circuit and the second output circuit, means connecting the impedance in the second input circuit, and means for regeneratively coupling the second output circuit with the second input circuit to increase the effective impedance.

4. An electric system having, in combination, a space-current device having a filament, a grid, a plate and a screening electrode, an input circuit connecting the filament and the grid, a tuned output circuit connecting the filament and the plate, means for connecting the screening electrode to screen the grid from the plate to render the internal impedance of the tube high, and a second space-current device having an input circuit coupled to the tuned output circuit and an output circuit regeneratively coupled to the tuned output circuit.

5. An electric system having, in combination, a four-electrode space-current device having an input circuit and an output circuit, means cooperating with one of the electrodes of the space-current device for preventing the feed-back of energy from the output circuit to the input circuit, a second space-current device having an input circuit and an output circuit, a high-impedance, tuned circuit coupling the second-named input circuit to the first-named output circuit, and means connected in the second-named output circuit regeneratively coupled to the tuned circuit.

6. An electric system having, in combination, a space-current device having an input circuit and an output circuit, leads from the space-current device to the input circuit and the output circuit, means for coupling the input circuit with the output circuit to create a tendency for the feed-back of energy from the output circuit to the input circuit, an impedance for producing a voltage drop, means connecting the impedance in the output circuit, means for preventing the feed-back of energy from the output circuit to the input circuit, a second space-current device having an input circuit in which the impedance is connected and an output circuit regeneratively coupled to the impedance, and a third space-current device having an input circuit and an output circuit, the input circuit of the third space-current device being connected with the output circuit of the first space-current device.

7. An electric system having, in combination, a four-electrode space-current device having an input circuit and an output circuit, means cooperating with one of the electrodes of the space-current device for preventing the feed-back of energy from the output circuit to the input circuit, a second space-current device having an input circuit and an output circuit, a high-impedance, tuned circuit coupling the second-named input circuit to the first-named output circuit, means connected in the second-named output circuit regeneratively coupled to the tuned circuit, a third space-current device having an input circuit and an output circuit, the input circuit of the third space-current device being connected with the output circuit of the first space-current device, and means for preventing the feed-back of energy from the output circuit to the input circuit of the third space-current device.

8. An electric system having, in combination, two space-current devices each having an input circuit and an output circuit, leads from each input circuit and each output circuit to the corresponding space-current device, means for coupling the input circuit with the output circuit of each device to create a tendency for the feed-back of energy from the output circuits to the corresponding input circuits, the input circuit of one device being coupled to the output circuit of the other device, means for preventing the feed-back of energy from the output circuit to the input circuit of the said other device, and means comprising space-current apparatus for producing a relatively high coupling impedance between the two first-named devices.

9. An electric system having, in combination, a screen-grid tube having a filament, a grid, a plate and a screening electrode, a second tube having an input circuit and an output circuit, an input circuit connecting the filament and the grid, a high-impedance output circuit connecting the filament and the plate and coupled to the second tube, means connecting the screening electrode to the circuits of the first-named tube to screen the grid from the plate to render the internal impedance of the first-named tube high, and means regeneratively coupling the output circuit of the second tube to the high-impedance output circuit.

10. An electric system having, in combination, two space-current devices each having an input circuit and an output circuit, leads from each input circuit and each output circuit to the corresponding space-current device, means for coupling the input circuit with the output circuit of each device to create a tendency for the feed-back of energy from the output circuits to the corresponding input circuits, means for feeding energy from one of the space-current devices to the other space-current device, a screening electrode, means co-operating with the screening electrode for preventing the feed-back of energy from the output circuit to the input circuit of said other space-current device, and means acting independently of the space-current devices for regeneratively coupling the two space-current devices together.

11. An electric system having, in combination, two space-current devices each having an input circuit and an output circuit, leads from each input circuit and each output circuit to the corresponding space-current device, means for coupling the input circuit with the output circuit of each device to create a tendency for the feed-back of energy from the output circuits to the corresponding input circuits, tuning means coupling the two space-current devices together for feeding energy from one of the space-current devices to the other space-current device, a screening electrode, means co-operating with the screening electrode for preventing the feed-back of energy from the output circuit to the input circuit of said other space-current device, and means for producing regeneration in the tuned coupling means acting independently of the space-current devices.

12. An electric system having, in combination, two space-current devices each having an input circuit and an output circuit, leads from each input circuit and each output circuit to the corresponding space-current device, the input circuit of one device being connected to the output circuit of the other device, a screening electrode, means co-operating with the screened electrode for preventing electrostatic coupling between the input and output circuits of one of the space current devices and means comprising space-current apparatus for coupling the two first-named devices.

13. An electric system having, in combination, two space-current devices each having an input circuit and an output circuit, leads from each input circuit and each output circuit to the corresponding space-current device, the input circuit of one device being connected to the output circuit of the other device, a screening electrode means co-operating with the screened electrode for preventing electrostatic coupling between the input and output circuits of one of the space current devices and a rectifier coupling the two first-named devices.

14. An electric system having, in combination, two space-current devices each having an input circuit and an output circuit, leads from each input circuit and each output circuit to the corresponding space-current device, the input circuit of one device being coupled to the output circuit of the other device, means for preventing the feed-back of energy from the output circuit to the input circuit of the said other device, and means comprising negative resistance means for producing a relatively high coupling impedance between the two first-named devices.

EDWARD L. BOWLES.